(No Model.)

E. B. RICH.
MEAT ROASTER.

No. 399,561. Patented Mar. 12, 1889.

Witnesses,
Celeste R. Chapman.
Franc M. Ireland.

Inventor,
Elisha B. Rich.
By his Attorney Francis W. Parker

UNITED STATES PATENT OFFICE.

ELISHA B. RICH, OF CHICAGO, ILLINOIS.

MEAT-ROASTER.

SPECIFICATION forming part of Letters Patent No. 399,561, dated March 12, 1889.

Application filed February 24, 1888. Serial No. 265,209. (No model.)

*To all whom it may concern:*

Be it known that I, ELISHA B. RICH, a citizen of the United States, residing at Chicago, in the county of Cook and State of Illinois, have invented a new and useful Meat-Roaster, of which the following is a specification.

My invention relates to meat-roasters or devices for conveniently roasting meats, and has for its object to provide means whereby meat may be roasted and the gravy or sauce be poured over it during the process with convenience. This object I accomplish by the mechanism illustrated in the accompanying drawings, wherein—

Figure 1:
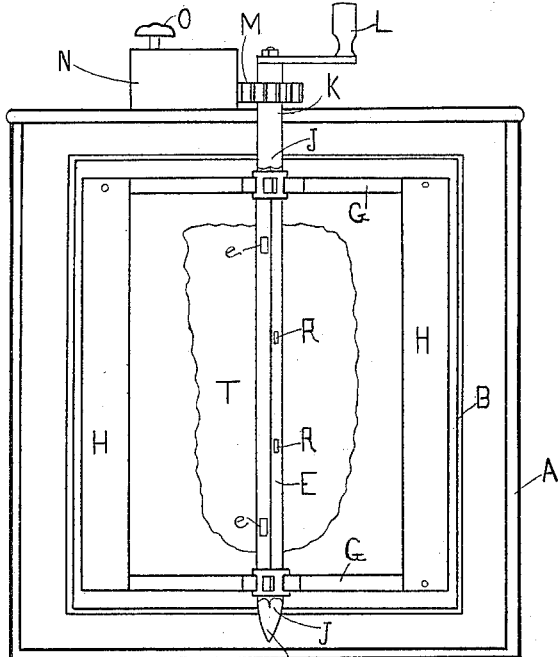
Figure 4:
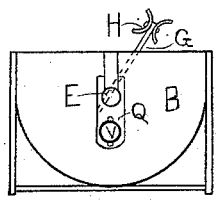
Figure 2:
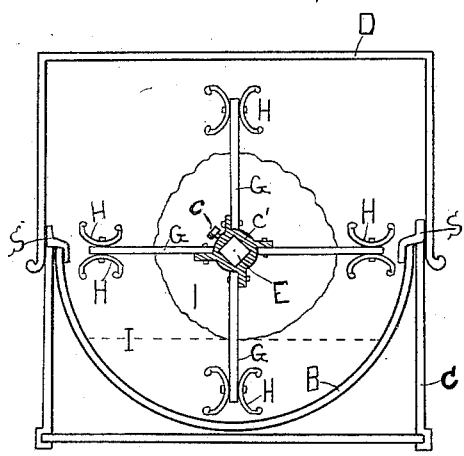
Figure 3:
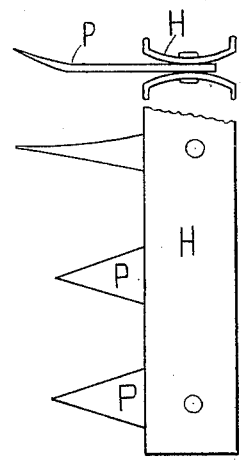

Figure 1 is a plan view of my device with outline of inclosing oven and lid removed. Fig. 2 is a cross-section. Fig. 3 shows details of the device for pouring the gravy or basting. Fig. 4 is an end view showing bearing and adjustable arm.

Like parts are indicated by the same figure in all the drawings.

A is an oven or other compartment wherein the meat is to be roasted.

B is a roasting-pan circular in cross-section, as shown in the drawings, and having the supporting parts C.

D is a cover for the pan, which rests on the edge of the pan by means of the lugs S S.

E is a transverse rod or spit on which the meat to be roasted is secured. It is provided with the sharp point F, whereby it may be thrust through the meat, if desired. It is journaled at the points J J on the pan.

K is an aperture through the side or door of the oven, through which the rod projects.

L is a crank or handle on the rod, and M is a pinion thereon, which meshes with the operative parts of the clock mechanism or other motor N.

O is the key of said mechanism.

G G are arms removably secured to the rod, and carrying at their extremities the transverse concave pouring or basting devices H H. Some of these pouring devices are provided with teeth or prongs P P, with which such pouring devices may be attached to the meat directly, instead of being attached to the arms G G. In this case the arms G G may be dispensed with.

Two of the pouring devices H H are attached back to back, so as to fit the devices for rotating in either direction. The crank or handle may be within the oven.

The arms G are attached to the collar $c'$, which is secured on the rod E by the set-screw $c$; or they may be inserted into the slots $e\ e$ or similar slots in the rod, so that they may be adjustably secured as to length and as to position on the rod.

T is a piece of meat, and I is the surface-line of the liquid in the pan.

Q is a vertically-adjustable bearing secured to the pan by the thumb-screw V.

The pieces H H are secured, as desired, to the ends of the arms G.

R R are skewer-holes.

The use and operation of my invention are as follows: The meat is attached to the rod E in any convenient way, as by passing the rod through it. The rod may be square in cross-section, and then the arms G G may be placed on the rod. The rod is now placed in its bearings at J J on the edge of the pan. Any suitable quantity of water or liquid is now placed in the bottom of the pan, and when the meat begins to roast the rod with the meat attached is rotated either by the clock-work, the crank, or other convenient devices. As the meat is rotated, the pouring or basting devices H H pass through the liquid and carry some of it upward until they rise above the meat, when they pour the same onto the meat. The direction of rotation can be reversed at will. Of course the two methods of rotation would not be used at the same time. If the pouring devices having the teeth P P are used, the arms G G may be dispensed with and the teeth be forced into the meat at proper points. These teeth are of any desired and varying lengths, and may be curved at the points. By moving the collar $c'$ on the rod and then setting it at the desired position the device may be made to accommodate itself to any sized piece of meat. Skewers might be passed through the meat and into the holes on the rod to keep the meat securely in position. When the arms G G are secured as shown in Fig. 4, they can be adjusted as to length. They may be secured by keys. By the use of the adjustable bearing the rod may be adjusted to accommodate itself to any depth of liquid or size of piece of meat.

I claim and desire to secure Letters Patent on the following:

1. A meat-roasting device consisting of a covered pan, a spit suitably journaled therein, radial arms on such spit, and transverse curved pouring devices upon such arms, the arms being of such length as to permit the pouring devices to dip into the liquid in the bottom of the pan.

2. In a meat-roasting device, the combination of a covered pan with a spit journaled therein, a crank attached thereto, arms upon said spit, and transverse curved pouring devices across said arms outside of the meat and in such position as to pass through the liquid in the bottom of the pan to carry it up and pour it on the meat as the rotation progresses.

ELISHA B. RICH.

Witnesses:
FRANCIS W. PARKER,
CORA L. CADWALLADER.